US012631223B2

(12) United States Patent
Dohi

(10) Patent No.: US 12,631,223 B2
(45) Date of Patent: May 19, 2026

(54) REVERSE-INPUT BLOCKING CLUTCH

(71) Applicant: NSK LTD., Tokyo (JP)

(72) Inventor: Nagao Dohi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/853,489

(22) PCT Filed: Dec. 22, 2022

(86) PCT No.: PCT/JP2022/047440
§ 371 (c)(1),
(2) Date: Oct. 2, 2024

(87) PCT Pub. No.: WO2023/195203
PCT Pub. Date: Oct. 12, 2023

(65) Prior Publication Data
US 2025/0215939 A1     Jul. 3, 2025

(30) Foreign Application Priority Data

Apr. 4, 2022     (JP) ................................. 2022-062585

(51) Int. Cl.
*F16D 41/08* (2006.01)
(52) U.S. Cl.
CPC .................................... *F16D 41/08* (2013.01)
(58) Field of Classification Search
CPC ......... F16D 41/08; F16D 41/066; F16D 67/02
See application file for complete search history.

(56) References Cited

U.S. PATENT DOCUMENTS

| 3,335,831 A | 8/1967 | Kalns |
| 5,547,291 A | 8/1996 | Miyazaki et al. |
| 2022/0042555 A1* | 2/2022 | Dohi ..................... F16D 43/211 |
| 2022/0060084 A1 | 2/2022 | Kishida et al. |

FOREIGN PATENT DOCUMENTS

| JP | 7-167133 A | 7/1995 |
| JP | 6658965 B2 | 3/2020 |
| WO | 2019/216280 A1 | 11/2019 |
| WO | 2020/054763 A1 | 3/2020 |
| WO | 2021/054479 A1 | 3/2021 |

OTHER PUBLICATIONS

International Search Report for PCT/JP2022/047440 dated Feb. 21, 2023.
Office Action dated Jun. 17, 2025 in Japanese Patent Application No. 2024-076757.

* cited by examiner

*Primary Examiner* — Lori Wu
(74) *Attorney, Agent, or Firm* — Sughrue Mion, PLLC

(57) ABSTRACT

A reverse-input blocking clutch includes a housing, an input shaft, an output shaft, a pair of engaging elements, a first bearing mechanism provided between the input shaft and the housing, and a second bearing mechanism provided between the output shaft and the housing. At least one of the input shaft, the output shaft, and the housing has a raceway surface which contacts at least one rolling element of the first bearing mechanism and the second bearing mechanism.

15 Claims, 10 Drawing Sheets

REVERSE-INPUT BLOCKING CLUTCH

CROSS REFERENCE TO RELATED APPLICATIONS

This application is a National Stage of International Application No. PCT/JP2022/047440 filed Dec. 22, 2022, claiming priority based on Japanese Patent Application No. 2022-062585 filed Apr. 4, 2022.

TECHNICAL FIELD

The present invention relates to a reverse-input blocking clutch.

BACKGROUND ART

Conventionally, a configuration of a reverse-input blocking clutch which includes an input shaft connected to an input mechanism such as a drive source and an output shaft connected to an output mechanism such as a speed reducer and is configured to allow the transmission of rotational force from the input shaft to the output shaft and block the transmission of rotational force from the output shaft to the input shaft. Various techniques have been proposed for improving the performance of the reverse-input blocking clutch.

For example, Patent Document 1 (Japanese Patent No. 6658965) discloses a configuration of a lock type reverse-input blocking clutch that blocks a reverse input from an output shaft by preventing the rotation of the output shaft. The reverse-input blocking clutch includes an input shaft and an output shaft which are coaxially provided, a pressed member that has a pressed surface, and a pair of engaging elements which are movable in a radial direction.

According to the technique described in Patent Document 1, when rotational force is reversely input to the output shaft, the engaging element moves toward the pressed surface to frictionally engage with the pressed surface based on the engagement between the engaging element and the output shaft, so that the rotational force reversely input to the output shaft can be blocked.

SUMMARY OF INVENTION

Technical Problem

Incidentally, in the above-described conventional technique, for example, when the coaxiality of the input shaft, the output shaft, and the pressed member is poor, the gap between the input shaft and the engagement element or between the engagement element and the pressed surface is different. As a result, there is a risk that performance may deteriorate due to uneven contact or the like.

For example, when the coaxiality of the input shaft and the pressed member is poor, the size of the gap between each engaging element and the input shaft is different. Therefore, when rotational force is input to the input shaft, only one engaging element contacts the input shaft first and torque concentrates on one engaging element until the other engaging element contacts the input shaft. As a result, there is a risk that performance may deteriorate due to the occurrence of component wear, vibration, foreign matter contamination, and the like.

Furthermore, for example, when the coaxiality of the output shaft and the pressed member is poor, the size of the gap between each engaging element and the pressed member is different. Therefore, when rotational force is reversely input to the output shaft, only one engaging element contacts the pressed member first and the pressing force is weak until the other engaging element contacts the output shaft, such that the lock function does not sufficiently act. As a result, there may be time loss until the locked state. Furthermore, since only one engaging element contacts the output shaft to bend the output shaft, there is a risk that performance may be reduced.

Thus, in the conventional technique described in Patent Document 1, there is room for improvement in terms of improving the performance of the reverse-input blocking clutch.

Therefore, an object of the present invention is to provide a reverse-input blocking clutch capable of improving coaxiality and stabilizing performance.

Solution to Problem

In order to solve the above-described problems, the present invention proposes the following.

A reverse-input blocking clutch according to a first aspect of the present invention includes: a housing which has a pressed surface; an input shaft which is provided inside the pressed surface in a radial direction; an output shaft which is provided inside the pressed surface in the radial direction; and a pair of engaging elements which move relative to each other in the radial direction and each of which has a first engaging portion facing the input shaft, a second engaging portion facing the output shaft, and a sliding contact portion facing the pressed surface, wherein when rotational force is input to the input shaft, the pair of engaging elements move toward each other radially inward based on the engagement between the input shaft and the first engaging portion and transmit the rotational force to the output shaft based on the engagement between the second engaging portion and the output shaft, wherein when rotational force is reversely input to the output shaft, the pair of engaging elements move away from each other radially outward based on the engagement between the output shaft and the second engaging portion and the pressed surface and the sliding contact portion are frictionally engaged, and wherein at least one of the input shaft, the output shaft, and the housing has a raceway surface which contacts at least one rolling element of a first bearing mechanism between the input shaft and the housing and a second bearing mechanism between the output shaft and the housing.

Advantageous Effects of Invention

According to the reverse-input blocking clutch of the present invention, coaxiality can be improved and performance can be stabilized.

DESCRIPTION OF EMBODIMENTS

Hereinafter, embodiments of the present invention will be described with reference to the drawings. In the following description, the axial direction, radial direction, and circumferential direction refer to the axial direction, radial direction, and circumferential direction of a central axis C of a reverse-input blocking clutch 1 unless otherwise specified.

First Embodiment

Reverse-Input Blocking Clutch

Figure 1:
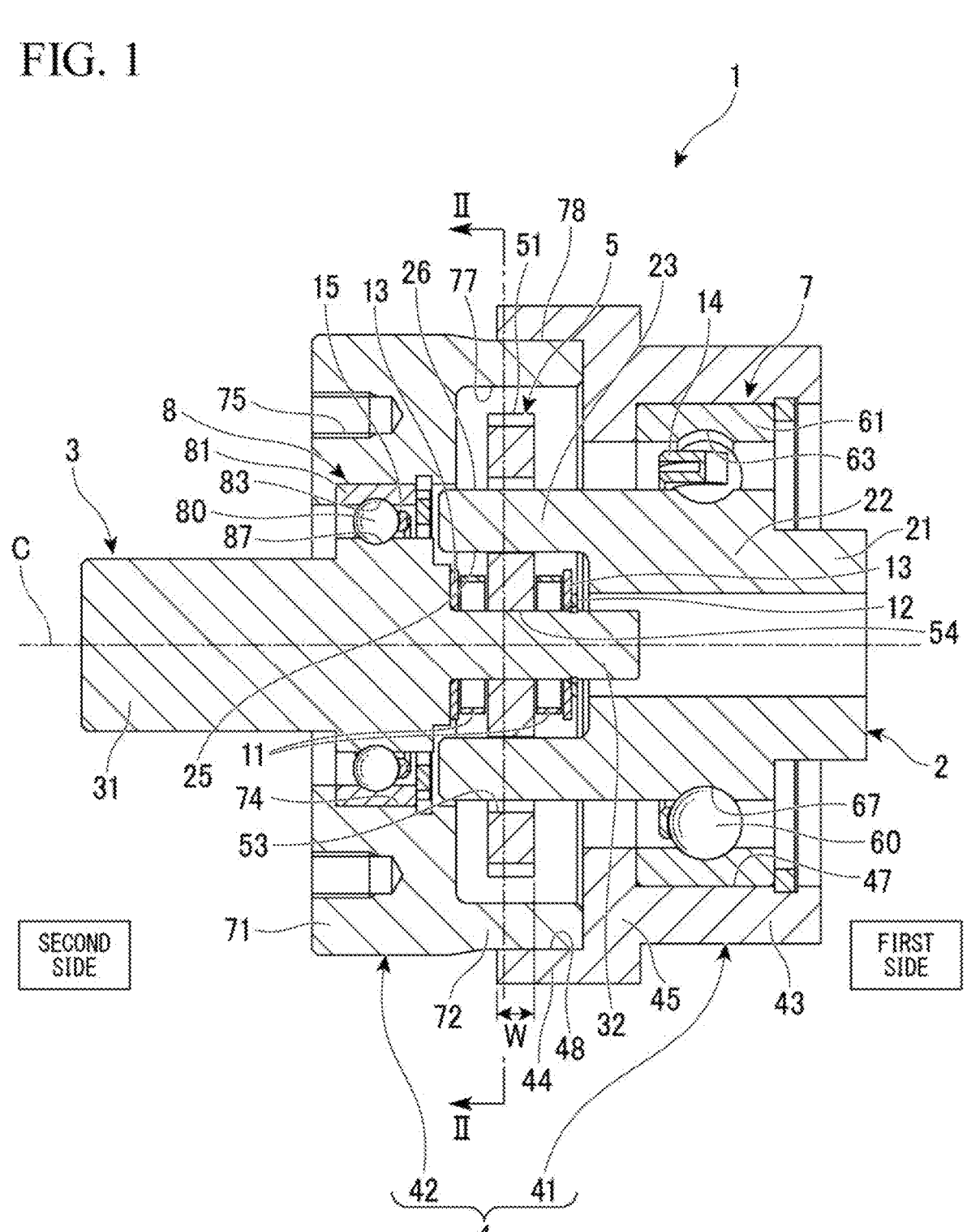
FIG. 1 is a cross-sectional view of a reverse-input blocking clutch according to a first embodiment.
Figure 2:
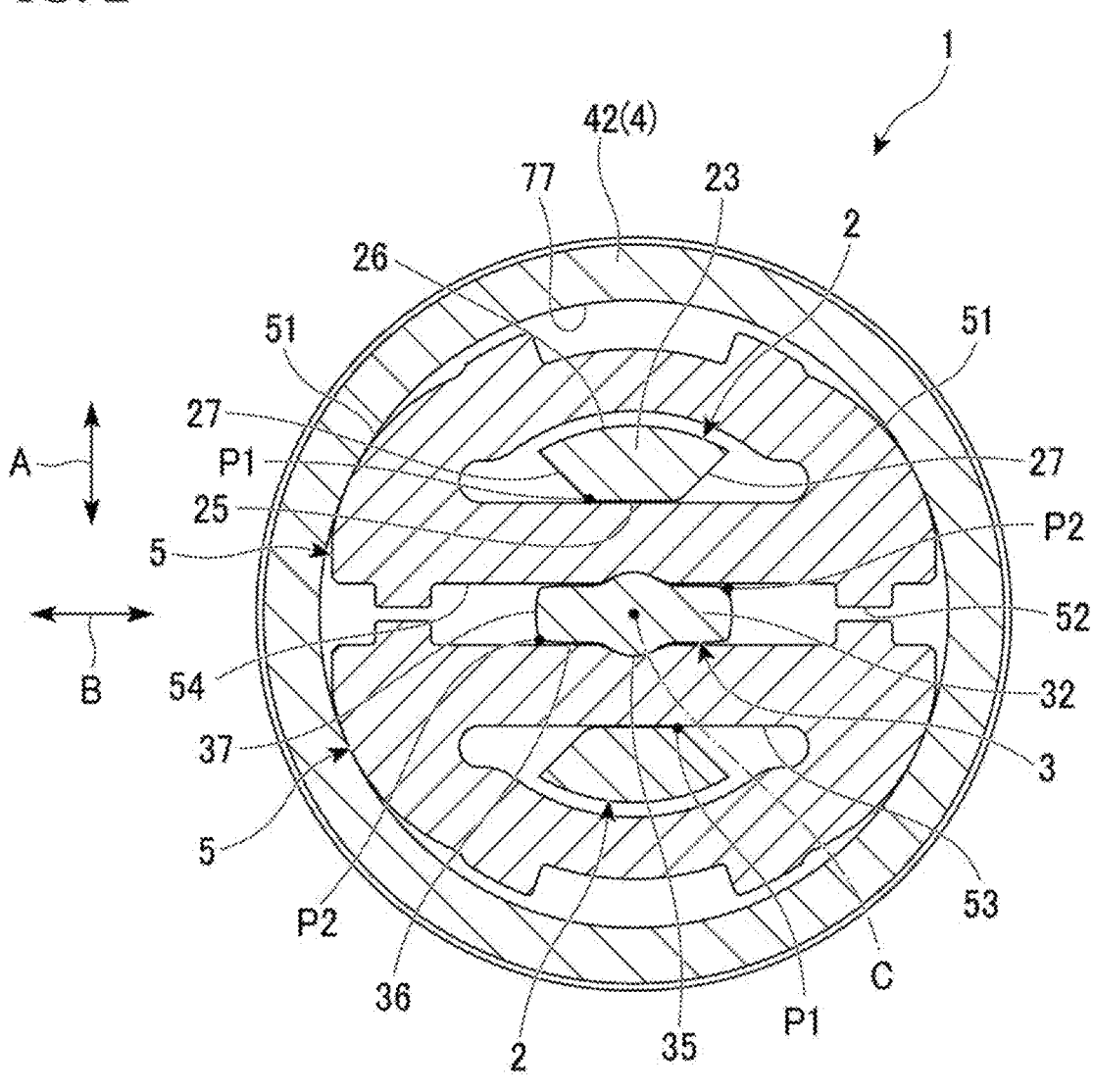
FIG. 2 is a cross-sectional view taken along a line II-II of FIG. 1.
Figure 3:
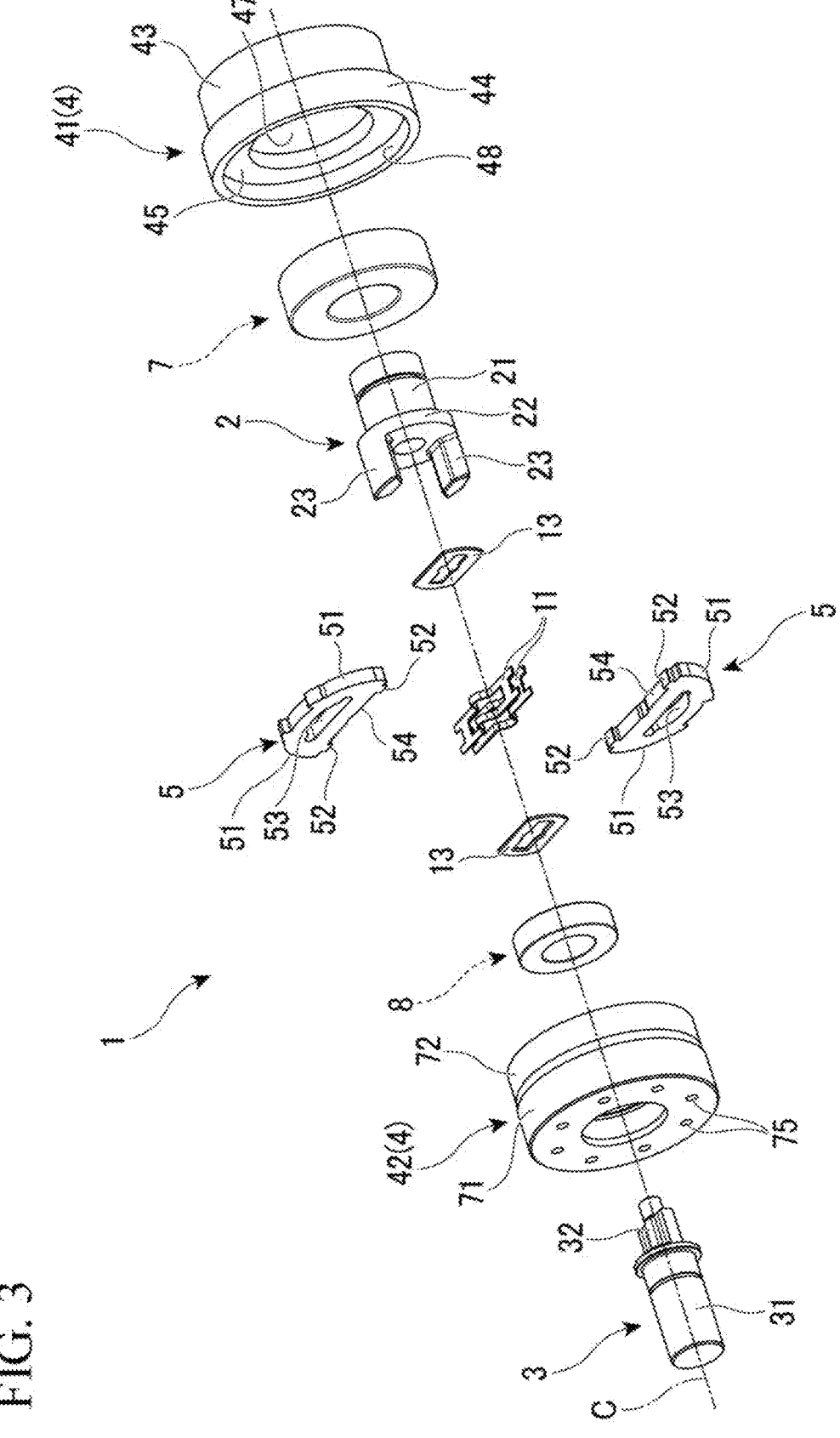
FIG. 3 is an exploded perspective view of the reverse-input blocking clutch according to the first embodiment.

FIG. 1 is a cross-sectional view of the reverse-input blocking clutch 1 according to a first embodiment. FIG. 2 is a cross-sectional view taken along a line II-II of FIG. 1. FIG. 3 is an exploded perspective view of the reverse-input blocking clutch 1 according to the first embodiment.

As shown in FIGS. 1 to 3, the reverse-input blocking clutch 1 includes an input shaft 2, an output shaft 3, a housing 4, a pair of engaging elements 5, and a plurality of bearing mechanisms 7 and 8. The reverse-input blocking clutch 1 transmits the rotational force input to the input shaft 2 to the output shaft 3. On the other hand, the reverse-input blocking clutch 1 has a reverse input blocking function that blocks the rotational force reversely input to the output shaft 3 and does not transmit the rotational force to the input shaft 2 or transmits only part of the rotational force to the input shaft 2 and blocks the remaining part thereof.

INPUT SHAFT

The input shaft 2 is connected to an input mechanism such as an electric motor (not shown). The rotational force from the input mechanism is input to the input shaft 2. As shown in FIGS. 1 and 3, in this embodiment, the input shaft 2 includes an input shaft body 21, a pedestal portion 22, and a pair of arm portions 23. The input shaft body 21 is provided on the input mechanism side in the axial direction. The input shaft body 21 is formed into a columnar (or cylindrical) shape centered on the central axis C. In the following description, the side of the input shaft 2 that is connected to the input mechanism may be referred to as the first side in the axial direction, and the opposite side may be referred to as the second side in the axial direction.

The pedestal portion 22 is provided at the second end of the input shaft body 21 in the axial direction. The pedestal portion 22 is integrally formed with the input shaft body 21. The pedestal portion 22 is formed into a disk shape having a larger outer diameter than the input shaft body 21.

An arm portion 23 extends from the pedestal portion 22 toward the side opposite to the input shaft body 21 in the axial direction (that is, the second side in the axial direction). The arm portion 23 is integrally formed with the pedestal portion 22. As shown in FIG. 3, a pair of the arm portions 23 are provided at both ends of the pedestal portion 22 in the radial direction. Thus, the arm portion 23 is provided at a position offset to the outside in the radial direction from the input shaft body 21. As shown in FIG. 2, the arm portion 23 is formed into a trapezoidal shape with one side curved when viewed from the axial direction. Specifically, the arm portion 23 includes a flat surface portion 25 which faces inward in the radial direction, a curved surface portion 26 which faces outward in the radial direction, and two side surface portions 27 and 27 which connect the ends of the flat surface portion 25 and the curved surface portion 26. The curved surface portion 26 is formed in an arc shape centered on the central axis C.

A plurality of the arm portions 23 are provided depending on the number of engaging elements 5 to be described later. In this embodiment, the pair of arm portions 23 are provided in accordance with the pair of engaging elements 5 to be provided. Furthermore, the number of arm portions 23 is not limited to two, and the number of the arm portions 23 may be any number depending on the number of the engaging elements 5.

Output Shaft

The output shaft 3 is connected to an output mechanism such as a reducer (not shown) and outputs rotational force (rotational torque). The output shaft 3 is disposed coaxially with the input shaft 2. As shown in FIGS. 1 and 3, the output shaft 3 includes an output shaft body 31 and an insertion portion 32. The output shaft body 31 is provided on the output mechanism side in the axial direction (the second side in the axial direction). The output shaft body 31 is formed in a columnar (or cylindrical) shape centered on the central axis C.

The insertion portion 32 extends from the first end of the output shaft body 31 in the axial direction toward the first side in the axial direction. The insertion portion 32 is integrally formed with the output shaft body 31. As shown in FIGS. 1 and 2, the insertion portion 32 is a portion inserted between the pair of engaging elements 5 to be described later and is disposed on the inside of the pair of arm portions 23 of the input shaft 2 in the radial direction. The insertion portion 32 is formed into a flat shape with a smaller outer diameter than the output shaft body 31. As shown in FIG. 2, the outer peripheral surface of the insertion portion 32 includes an arc surface 35 which is formed in an arc shape, side surfaces 36 on both sides in the short axis direction (the vertical direction in FIG. 2), and guide surfaces 37 on both sides of the long axis direction (the horizontal direction in FIG. 2).

The arc surface 35 is formed in an arc shape centered on the central axis C. Each side surface 36 is connected to the end of the arc surface 35 and is formed by a flat surface perpendicular to the short axis direction of the insertion portion 32. Each side surface 36 faces each of the pair of engaging elements 5. The guide surfaces 37 are arranged on both sides of the side surface 36 and are configured such that the guide surfaces 37 are continuous in the short axis direction to form one convex curved surface between both side surfaces 36. Specifically, the guide surface 37 is formed in an arc shape centered on the central axis C.

The plurality of side surfaces 36 and guide surfaces 37 of the insertion portion 32 are provided depending on the number of engaging elements 5 to be described later. In this embodiment, the pair of side surfaces 36 and the guide surface 37 are provided in accordance with the pair of engaging elements 5 to be provided. Furthermore, the number of the side surfaces 36 is not limited to two, and the number of the side surfaces 36 may be any number depending on the number of the engaging elements 5.

Housing

As shown in FIGS. 1 and 2, the housing 4 has a hollow disk shape and is fixed to another member (not shown) to restrict its rotation. The housing 4 is disposed coaxially with the input shaft 2 and the output shaft 3. The housing 4 accommodates the input shaft 2, the output shaft 3, and the pair of engaging elements 5. The housing 4 of this embodiment includes a first housing 41 and a second housing 42. The first housing 41 and the second housing 42 of this embodiment are formed of the same material.

The first housing 41 is disposed on the first side in the axial direction. The first housing 41 accommodates the input shaft 2 therein. The first housing 41 holds the input shaft 2 to be rotatable about the central axis C via a first bearing mechanism 7 which will be described later.

The second housing 42 is disposed on the second side of the first housing 41 in the axial direction. The second housing 42 accommodates the output shaft 3 and the pair of engaging elements 5 therein. The second housing 42 holds the output shaft 3 to be rotatable about the central axis C via a second bearing mechanism 8 which will be described later. A pressed surface 77 coaxial with the central axis C is provided on the inner peripheral surface of the second housing 42. The engaging element 5 is provided on the inside of the pressed surface 77.

The first housing 41 and the second housing 42 configured in this manner are joined to each other by spigot joining as will be described in detail later.

Specifically, the first housing 41 includes a cylindrical portion 43, a flange portion 44, and an end plate portion 45. The cylindrical portion 43 is provided at a position corresponding to the input shaft body 21 of the input shaft 2 in the axial direction. The inner peripheral surface of the cylindrical portion 43 is formed coaxially with the input shaft 2. The input shaft 2 is held by the inner peripheral surface of the cylindrical portion 43. Part of the inner peripheral surface of the cylindrical portion 43 serves as a bearing receiving portion 47 provided with the first bearing mechanism 7 which will be described later.

The flange portion 44 is provided at a position corresponding to the arm portion 23 of the input shaft 2 in the axial direction. The flange portion 44 is connected to the second end of the cylindrical portion 43 in the axial direction and is provided on the second side of the cylindrical portion 43 in the axial direction. The inner diameter of the flange portion 44 is larger than the inner diameter of the cylindrical portion 43. The inner peripheral surface of the flange portion 44 is formed coaxially with the input shaft 2.

The flange portion 44 includes a first spigot fitting surface 48 on the inner peripheral surface on the second side in the axial direction. The first spigot fitting surface 48 is formed as a cylindrical surface centered on the central axis C. The first spigot fitting surface 48 has an inner diameter dimension that allows the first spigot fitting surface to fit without rattling to a second spigot fitting surface 78 provided in the second housing 42 which will be described later. Fitting without rattling includes, for example, fitting with a gap that allows for dimensional tolerance during manufacturing. The first spigot fitting surface 48 and the bearing receiving portion 47 of the cylindrical portion 43 are formed to be coaxial.

The end plate portion 45 is provided between the cylindrical portion 43 and the flange portion 44 in the axial direction. The end plate portion 45 is formed in a disk shape along a plane perpendicular to the central axis C. In other words, the end plate portion 45 extends in the radial direction to connect the cylindrical portion 43 and the flange portion 44 which have different diameters.

The second housing 42 includes a small diameter cylindrical portion 71 having a cylindrical shape and a large diameter cylindrical portion 72 having a cylindrical shape. The small diameter cylindrical portion 71 is provided at a position corresponding to the output shaft body 31 of the output shaft 3 in the axial direction. The inner peripheral surface of the small diameter cylindrical portion 71 is formed coaxially with the output shaft 3. The output shaft 3 is held by the inner peripheral surface of the small diameter cylindrical portion 71. Part of the inner peripheral surface of the small diameter cylindrical portion 71 serves as a bearing receiving portion 74 provided with the second bearing mechanism 8 which will be described later. As shown in FIG. 3, the end surface of the small diameter cylindrical portion 71 on the second side in the axial direction is provided with a plurality of (in this embodiment, eight) fastening holes 75 in the circumferential direction. The fastening hole 75 is formed such that the depth direction matches the axial direction. By the bolt inserted into the fastening hole 75, the second housing 42 is fixed (connected) to other components.

The large diameter cylindrical portion 72 is provided at a position corresponding to the insertion portion 32 of the output shaft 3 in the axial direction. The large diameter cylindrical portion 72 is connected to the first end of the small diameter cylindrical portion 71 in the axial direction and is provided on the first side of the small diameter cylindrical portion 71 in the axial direction. The inner diameter of the large diameter cylindrical portion 72 is larger than the inner diameter of the small diameter cylindrical portion 71. The inner peripheral surface of the large diameter cylindrical portion 72 is formed coaxially with the output shaft 3. The output shaft 3 and the pair of engaging elements 5 are accommodated inside the large diameter cylindrical portion 72.

The large diameter cylindrical portion 72 includes the pressed surface 77 on the inner peripheral surface. The pressed surface 77 is formed as a cylindrical surface centered on the central axis C. The input shaft 2 and the output shaft 3 are provided on the inside of the pressed surface 77 in the radial direction. The large diameter cylindrical portion 72 includes the second spigot fitting surface 78 on the outer peripheral surface on the first side in the axial direction. The second spigot fitting surface 78 is formed as a cylindrical surface centered on the central axis C. The second spigot fitting surface 78, the pressed surface 77, and the bearing receiving portion 74 of the small diameter cylindrical portion 71 are formed to be coaxial.

With the above-described configuration, the housing 4 is assembled by fitting the first spigot fitting surface 48 of the first housing 41 to the second spigot fitting surface 78 of the second housing 42 without rattling. In a state in which the first housing 41 and the second housing 42 are assembled, the end surface of the large diameter cylindrical portion 72 of the second housing 42 on the first side in the axial direction comes into contact with the end plate portion 45 of the first housing 41.

The first spigot fitting surface 48 of the first housing 41 and the bearing receiving portion 47 are arranged coaxially and the second spigot fitting surface 78 of the second housing 42 and the bearing receiving portion 74 are arranged coaxially. Therefore, the bearing receiving portion 47 of the first housing 41 and the bearing receiving portion 74 of the second housing 42 are arranged coaxially in the assembled state of the housing 4 in which the first spigot fitting surface 48 and the second spigot fitting surface 78 are fitted to each other without rattling.

Engaging Element

As shown in FIGS. 2 and 3, the pair of engaging elements 5 are formed in a semicircular shape and are arranged inside the housing 4 in the radial direction. The pair of engaging elements 5 are configured to be movable toward or away from each other in the radial direction. Each of the pair of engaging elements 5 includes a sliding surface 51 (a sliding contact portion in the claims), a bottom surface 52, an input side engaging portion (a first engaging portion in the claims) 53, and an output side engaging portion (a second engaging portion in the claims) 54.

The sliding surface 51 is a radially outer surface that is pressed against the pressed surface 77 and has an arc convex surface. Furthermore, the sliding surface 51 may be provided in part of the arc convex surface. The sliding surface 51 slides on the pressed surface 77 when the reverse-input blocking clutch 1 is in the locked state (the reverse input from the output shaft 3 is blocked). Furthermore, the radial direction with respect to the engaging element 5 may refer to a direction perpendicular to the bottom surface 52 indicated by arrow A in FIG. 2, and the direction parallel to the bottom surface 52 indicated by arrow B in FIG. 2 may refer to the width direction with respect to the engaging element 5. The curvature radius of the sliding surface 51 is equal to or smaller than the curvature radius of the pressed surface 77. Two sliding surfaces 51 are provided at two positions for one engaging element 5 and are formed so that the frictional engaging force between the engaging element 5 and the pressed surface 77 is increased due to a wedge effect. Two sliding surfaces 51 are provided at positions spaced apart from each other in the circumferential direction of the engaging element 5. Furthermore, the sliding surface 51 may be formed directly from the surface of the engaging element 5 or may be formed to have a surface texture with a larger friction coefficient than other parts of the engaging element 5. For example, the sliding surface 51 may be formed of a friction material fixed to the engaging element 5 by pasting or gluing. The sliding surface 51 of each of the pair of engaging elements 5 faces the outside of the housing 4 in the radial direction.

The bottom surface 52 is provided on the inside of the sliding surface 51 in the radial direction. The bottom surface 52 forms a straight portion of the semicircular engaging element 5 together with an output side engaging portion 54 of the engaging element 5 which will be described in detail later. The bottom surface 52 has a flat surface shape. The bottom surfaces 52 of the pair of engaging elements 5 face each other in the radial direction. The pair of bottom surfaces 52 are formed to face each other with a gap therebetween when the engaging element 5 is in an unlocked state (a state in which transmission of rotational force from the input shaft 2 to the output shaft 3 is allowed).

The inner diameter dimension of the pressed surface 77 and the radial dimension of the engaging element 5 are set so that a gap exists in at least one of between the pressed surface 77 and the sliding surface 51 and between the pair of bottom surfaces 52 while the pair of engaging elements 5 are arranged on the inside of the housing 4 in the radial direction. In this embodiment, the height of the bottom surface 52 along the radial direction (the direction of arrow A) is slightly smaller than ½ of the width dimension along the short axis direction of the insertion portion 32 of the output shaft 3.

The input side engaging portion 53 is a hole that passes through the radially middle portion of the engaging element 5 in the axial direction. The input side engaging portion 53 is a semicircular long hole that is long in the width direction. The arm portion 23 of the input shaft 2 engages with the input side engaging portion 53. The input side engaging portion 53 has a size that allows the arm portion 23 of the input shaft 2 to be loosely inserted. Specifically, a gap exists between the arm portion 23 and the inner surface of the input side engaging portion 53 in each of the width direction and the radial direction of the engaging element 5 while the arm portion 23 of the input shaft 2 is inserted into the input side engaging portion 53. Thus, the arm portion 23 is displaceable in the rotation direction of the input shaft 2 with respect to the input side engaging portion 53 (the engaging element 5) and the input side engaging portion 53 is displaceable in the radial direction of the engaging element 5 with respect to the arm portion 23.

The output side engaging portion 54 is a portion extending from the center portion in the width direction to the middle portion in the width direction among the straight portions of the engaging element 5 formed in a semicircular shape. The output side engaging portion 54 is provided on the inside of the input side engaging portion 53 in the radial direction. The output side engaging portion 54 is provided on the inside of the bottom surface 52 of the engaging element 5 in the width direction B. The insertion portion 32 of the output shaft 3 engages with the output side engaging portion 54. The output side engaging portion 54 has a size and shape that allows the insertion portion 32 of the output shaft 3 to be placed inside thereof without rattling. Specifically, the output side engaging portion 54 has an opening width along the direction of arrow B that is larger than the length along the long axis direction of the insertion portion 32 of the output shaft 3. The opening width of the output side engaging portion 54 along the direction of arrow B may be formed to be equal to the length of the insertion portion 32 of the output shaft 3 in the long axis direction.

In a state in which the reverse-input blocking clutch 1 is assembled, the arm portion 23 of the input shaft 2 is inserted into the input side engaging portion 53 of each of the pair of engaging elements 5 in the axial direction and the insertion portion 32 of the output shaft 3 is inserted between the output side engaging portions 54 of the pair of engaging elements 5 in the axial direction. That is, the pair of engaging elements 5 are arranged so that the output side engaging portions 54 sandwich the insertion portion 32 of the output member from the outside in the radial direction.

Furthermore, as shown in FIG. 3, a sheet metal elastic member 11 may be provided between the pair of engaging elements 5. The elastic member 11 is disposed to be elastically sandwiched between the engaging element 5 and the output shaft 3. The elastic member 11 urges the engaging element 5 outward in the radial direction, that is, toward the pressed surface 77. An end plate 13 may be provided on both sides of the engaging element 5 in the axial direction. For example, these end plates 13 function as components for positioning each member in the axial direction or components for preventing the contact between the engaging element 5, the output shaft 3, and input shaft 2 to suppress wear. In addition, a C-ring 12 or the like may be separately provided for positioning each component in the axial direction.

As shown in FIG. 1, the first spigot fitting surface 48 of the first housing 41 overlaps at least part of the engaging element 5 in the axial direction in a state in which the first housing 41, the second housing 42, and the engaging element 5 are assembled. Specifically, the second end of the flange portion 44 of the first housing 41 in the axial direction is located on the second side in the axial direction in relation to the first end of the engaging element 5 in the axial direction. In other words, the first spigot fitting surface 48 of the first housing 41 is formed to have an engagement allowance in the axial direction with respect to the engaging element 5. In this embodiment, the first spigot fitting surface 48 of the first housing 41 overlaps the engaging element 5 by a length W in the axial direction.

Bearing Mechanisms

As shown in FIG. 1, the plurality of bearing mechanisms include the first bearing mechanism 7 and the second bearing mechanism 8. In this embodiment, all of the first bearing mechanism 7 and the second bearing mechanism 8 are ball bearings.

The first bearing mechanism 7 is provided between the input shaft 2 and the first housing 41 and rotatably holds the input shaft 2 with respect to the first housing 41. The first bearing mechanism 7 includes a ball (a rolling element in the claims) 60 which rolls about an axis, an outer ring 61, an outer ring raceway groove 63 which is formed in the outer ring 61, and an inner ring raceway groove 67 which is integrally formed with the input shaft 2. The inner ring raceway groove 67 is an example of a raceway surface in the claims. The outer peripheral surface of the outer ring 61 is attached to the bearing receiving portion 47 of the cylindrical portion 43 in the first housing 41 with a gap or the like. The inner peripheral surface of the outer ring 61 is provided with the outer ring raceway groove 63 for rolling the ball 60. The outer peripheral surface of the input shaft 2 is provided with the inner ring raceway groove 67 which contacts the ball 60 and rolls the ball 60. In other words, the first bearing mechanism 7 of this embodiment is formed without separately having a member constituting the inner ring. Furthermore, a retainer 14 that holds between the ball 60 and the ball 60 may be provided. Furthermore, the first bearing mechanism 7 may have a ball bearing design in which the balls 60 are assembled without deforming the outer ring 61.

The second bearing mechanism 8 is provided between output shaft 3 and the second housing 42 and rotatably holds the output shaft 3 with respect to the second housing 42. The second bearing mechanism 8 includes a ball (a rolling element in the claims) 80 which rolls about an axis, an outer ring 81, an outer ring raceway groove 83 which is formed in the outer ring 81, and an inner ring raceway groove 87 which is integrally formed with the output shaft 3. The inner ring raceway groove 87 is an example of a raceway surface in the claims. The outer peripheral surface of the outer ring 81 is attached to the bearing receiving portion 74 of the small diameter cylindrical portion 71 in the second housing 42 with a gap or the like. The inner peripheral surface of the outer ring 81 is provided with the outer ring raceway groove 83 for rolling the ball 80. The outer peripheral surface of the output shaft 3 is provided with the inner ring raceway groove 87 which contacts the ball 80 and rolls the ball 80. In other words, the second bearing mechanism 8 of this embodiment is formed without separately having a member constituting the inner ring. Furthermore, a retainer 15 that holds between the ball 80 and the ball 80 may be provided. Furthermore, similar to the first bearing mechanism 7, the second bearing mechanism 8 of this embodiment may have a ball bearing design in which the balls 80 are assembled without deforming the outer ring 81.

Operation of Reverse-Input Blocking Clutch

Next, the operation of the reverse-input blocking clutch 1 of this embodiment will be described.

First, the case where the rotational force is input to the input shaft 2 from the input mechanism will be described. When the rotational force is input to the input shaft 2, as shown in FIG. 2, the arm portion 23 of the input shaft 2 rotates about the central axis C in the rotation direction of the input shaft 2 (in the example shown in FIG. 2, counterclockwise) inside the input side engaging portion 53. Then, the corner portion (see point P1 in FIG. 2) between the side surface portion 27 and the flat surface portion 25 of the arm portion 23 presses the inner surface of the input side engaging portion 53 radially inward and moves each of the pair of engaging elements 5 in the direction away from the pressed surface 77 (that is, in the radial direction). That is, the pair of engaging elements 5 move toward each other radially inward due to the rotational force applied from the input shaft 2 via the input side engaging portion 53. Specifically, the engaging element 5 located on the upper side of FIG. 2 is moved downward, and the engaging element 5 located on the lower side of FIG. 2 is moved upward. As a result, the bottom surfaces 52 of the pair of engaging elements 5 move toward each other, and the pair of output side engaging portions 54 clamp the insertion portion 32 of the output shaft 3 from both sides in the radial direction.

Accordingly, the insertion portion 32 and the pair of output side engaging portions 54 are engaged without rattling while the output shaft 3 is rotated such that the long axis direction of the insertion portion 32 is parallel to the bottom surface of the engaging element 5. Thus, the rotational force input to the input shaft 2 is transmitted to the output shaft 3 via the pair of engaging elements 5 and is output from the output shaft 3.

The reverse-input blocking clutch 1 of this embodiment moves each of the pair of engaging elements 5 in the direction away from the pressed surface 77 regardless of the rotation direction of the input shaft 2 when the rotational force is input to the input shaft 2. Then, the rotational force input to the input shaft 2 is transmitted to the output shaft 3 via the pair of engaging elements 5 regardless of the rotation direction of the input shaft 2.

Next, the case where the rotational force is reversely input from the output mechanism to the output shaft 3 will be described. When the rotational force is reversely input to the output shaft 3, as shown in FIG. 2, the insertion portion 32 of the output shaft 3 rotates in the rotation direction of the output shaft 3 (in the example shown in FIG. 2, counterclockwise) inside the pair of output side engaging portions 54. Then, the side surfaces 36 in the insertion portion 32 and the corner portion (see point P2 in FIG. 2) between the guide surface 37 and the side surfaces 36 presses the output side engaging portion 54 radially outward and moves each of the pair of engaging elements 5 in the direction toward the pressed surface 77. That is, the pair of engaging elements 5 move away from each other radially outward based on the engagement between the output shaft 3 and the output side engaging portion 54. Specifically, the engaging element 5 located on the upper side of FIG. 2 is moved upward, and the engaging element 5 located on the lower side of FIG. 2 is moved downward. Accordingly, the sliding surface 51 of each of the pair of engaging elements 5 is pressed against the pressed surface 77 of the housing 4. At this time, the sliding surface 51 and the pressed surface 77 are frictionally engaged over the entire range or at least part of the sliding surface 51 in the circumferential direction.

As a result, the rotational force reversely input to the output shaft 3 is transmitted to the housing 4 fixed to another member (not shown) and is completely blocked so as not to be transmitted to the input shaft 2 or only part of the rotational force reversely input to the output shaft 3 is transmitted to the input shaft 2 and the remaining part is blocked.

In order to completely block the rotational force reversely input to the output shaft 3 not to be transmitted to the input shaft 2, the pair of engaging elements 5 is stretched between the insertion portion 32 and the housing 4 to lock the output shaft 3 such that the sliding surface 51 does not slide with respect to (rotate relative to) the pressed surface 77. On the other hand, in order to transmit only part of the rotational force reversely input to the output shaft 3 to the input shaft 2 and block the remaining part, the pair of engaging elements 5 are stretched between the insertion portion 32 and the housing 4 to semi-lock the output shaft 3 so that the sliding surface 51 slides with respect to the pressed surface 77. When the rotational force is further reversely input to the output shaft 3 while the output shaft 3 is semi-locked, the pair of engaging elements 5 rotate about the central axis C while sliding the sliding surface 51 with respect to the pressed surface 77 based on the engagement between the output side engaging portion 54 and the insertion portion 32 of the output shaft 3. When the pair of engaging elements 5 rotate, the inner surface of the input side engaging portion 53 presses the radially inner surface of the arm portion 23 of the input shaft 2 in the circumferential direction (rotation direction) such that a part of the rotational force is transmitted to the input shaft 2.

In the reverse-input blocking clutch 1 of this embodiment, the size of the gap between each component is adjusted such that the above-described operation is possible.

For example, when the rotational force is reversely input to the output shaft 3, the input shaft 2 is located at the neutral position while the sliding surface 51 of the engaging element 5 is in contact with the pressed surface 77 (locked state). The neutral position of the input shaft 2 is a position in which the flat surface portion 25 of the arm portion 23 is parallel to the input side engaging portion 53. In other words, a gap that allows the sliding surface 51 to be pressed against the pressed surface 77 exists between the inner surface of the input side engaging portion 53 and the flat surface portion 25 of the arm portion 23 based on the pressing of the corner portion (P2) of the insertion portion 32 of the output shaft 3 with respect to the output side engaging portion 54. Accordingly, when the rotational force is reversely input to the output shaft 3, the arm portion 23 does not prevent the radially outward movement of the engaging element 5. Further, the output shaft 3 is appropriately locked or semi-locked since the surface pressure acting on the contact portion between the sliding surface 51 and the pressed surface 77 changes in accordance with the magnitude of rotational force reversely input to the output shaft 3 even after the sliding surface 51 contacts the pressed surface 77.

Operation and Effect

The reverse-input blocking clutch 1 of this embodiment includes the housing 4, the input shaft 2, the output shaft 3, the pair of engaging elements 5, the first bearing mechanism 7, and the second bearing mechanism 8. The first bearing mechanism 7 includes the inner ring raceway groove 67 which is integrally formed with the input shaft 2. The second bearing mechanism 8 includes the inner ring raceway groove 87 which is integrally formed with the output shaft 3. Accordingly, compared to the case where the inner ring is provided, the number of fitting surfaces in each of the bearing mechanisms 7 and 8 is reduced, and the coaxiality of components connected via each of the bearing mechanisms 7 and 8 can be improved. Specifically, in this embodiment, it is possible to improve the coaxiality of the input shaft 2 and the housing 4 due to the first bearing mechanism 7. By improving the coaxiality of the input shaft 2 and the housing 4, it becomes easier to equalize the gaps between the pair of engaging elements 5 and the arm portion 23 of the input shaft 2. Accordingly, since the pair of arm portions 23 can press the engaging element 5 at the same timing, it is possible to prevent one arm portion 23 from pressing the engaging element 5 first. Thus, it is possible to improve the performance of the reverse-input blocking clutch 1 by suppressing the occurrence of component wear, vibration, foreign matter contamination, and the like. Similarly, it is possible to improve the coaxiality of the output shaft 3 and the housing 4 due to the second bearing mechanism 8. By improving the coaxiality of the output shaft 3 and the housing 4, it becomes easier to equalize the gaps between the pair of engaging elements 5 and the pressed surface 77 of the housing 4. Therefore, it is possible to improve the performance of the reverse-input blocking clutch 1 by suppressing the deterioration of the locking function and the occurrence of bending of the output shaft 3.

Thus, it is possible to provide the reverse-input blocking clutch 1 that can improve coaxiality and stabilize performance.

Furthermore, since there is no need to provide a separate member as the inner ring, the number of components, and the hardening process also can be reduced. Furthermore, since machining of the raceway groove and machining of the arm portion 23 of the input shaft 2 (in the case of the output shaft 3, the insertion portion 32) can be performed in the same process such as one chuck, the coaxiality between each shaft and the housing 4 can be further improved.

The housing 4 includes the first housing 41 and the second housing 42 and the first housing 41 and the second housing 42 are spigot-joined to each other. The coaxiality of the first housing 41 and the second housing 42 can be improved by spigot-joining them. As a result, it is possible to improve the coaxiality of the input shaft 2 attached to the first housing 41 and the output shaft 3 attached to the second housing 42.

The inner peripheral surface of the first housing 41 is the first spigot fitting surface 48, the outer peripheral surface of the second housing 42 is the second spigot fitting surface 78 spigot-jointed to the first spigot fitting surface 48, and the pressed surface 77 is provided on the inner peripheral surface of the second housing 42. Since the outer peripheral surface of the housing 4 (in this embodiment, the second housing 42) is the spigot fitting surface, the opening of the second housing 42 can be restricted from opening outward in the radial direction, and deformation of the housing 4 (second housing 42) can be suppressed. Thus, coaxiality can be maintained with high precision. Further, since the deformation of the pressed surface 77 can be suppressed by a simple structure consisting of two housings, that is, the first housing 41 and the second housing 42, it is possible to stabilize the performance of the reverse-input blocking clutch 1 by suppressing an increase in the radially outward movement amount of the pair of engaging elements 5 due to deformation.

The first spigot fitting surface 48 of the first housing 41 overlaps at least part of the engaging element 5 in the axial direction. By providing the engagement allowance with the engaging element S in the first spigot fitting surface 48 in the axial direction, it is possible to further improve the deformation suppressing effect of the pressed surface 77 in the second housing 42.

Furthermore, in the above-described embodiment, an example has been described in which the first spigot fitting surface 48 overlaps part of the engaging element 5 in the axial direction, but the present invention is not limited thereto. The first spigot fitting surface 48 may be provided to overlap the entire engaging element 5 in the axial direction. That is, the engagement allowance length W may be larger than the thickness of the engaging element 5. Similarly, since it is sufficient that the first spigot fitting surface 48 overlaps at least the engaging element 5 in the axial direction, for example, the engagement allowance length W may be shorter than the length shown in FIG. 1. However, since the deformation suppressing effect of the pressed surface 77 can be further improved as the engagement allowance becomes larger, it is preferable that the engagement allowance is large.

In the above-described embodiment, for example, the second bearing mechanism 8 may be a bearing mechanism having an inner ring and an outer ring. That is, only the inner ring raceway groove 67 of the first bearing mechanism 7 may be integrally formed with the input shaft 2. Similarly, only the inner ring raceway groove 87 of the second bearing mechanism 8 may be integrally formed with the output shaft 3.

In this embodiment, a configuration has been described in which the bearing mechanisms 7 and 8 respectively include only the outer rings 61 and 81 and the inner ring raceway grooves 67 and 87 are integrally formed with the input shaft 2 or the output shaft 3, but the present invention is not limited thereto. The bearing mechanisms 7 and 8 may respectively include the inner rings and the outer ring raceway grooves 63 and 83 may be integrally formed with the first housing 41 or the second housing 42. That is, at least one of the first bearing mechanism 7 and the second bearing mechanism 8 may include at least one of the inner ring raceway grooves 67 and 87 and the outer ring raceway grooves 63 and 83 integrally formed with any one of the input shaft 2, the output shaft 3, and the housing 4.

Next, second to eighth embodiments of the present invention will be described. In the following description, the same components as in the first embodiment described above will be indicated by the same reference numerals and the description will be omitted as appropriate. Furthermore, the specific configuration is not limited to these embodiments, and can be modified as appropriate without departing from the gist of the present invention. Each component shown in the first to eighth embodiments can be configured by appropriately combining them.

Second Embodiment

Figure 4:
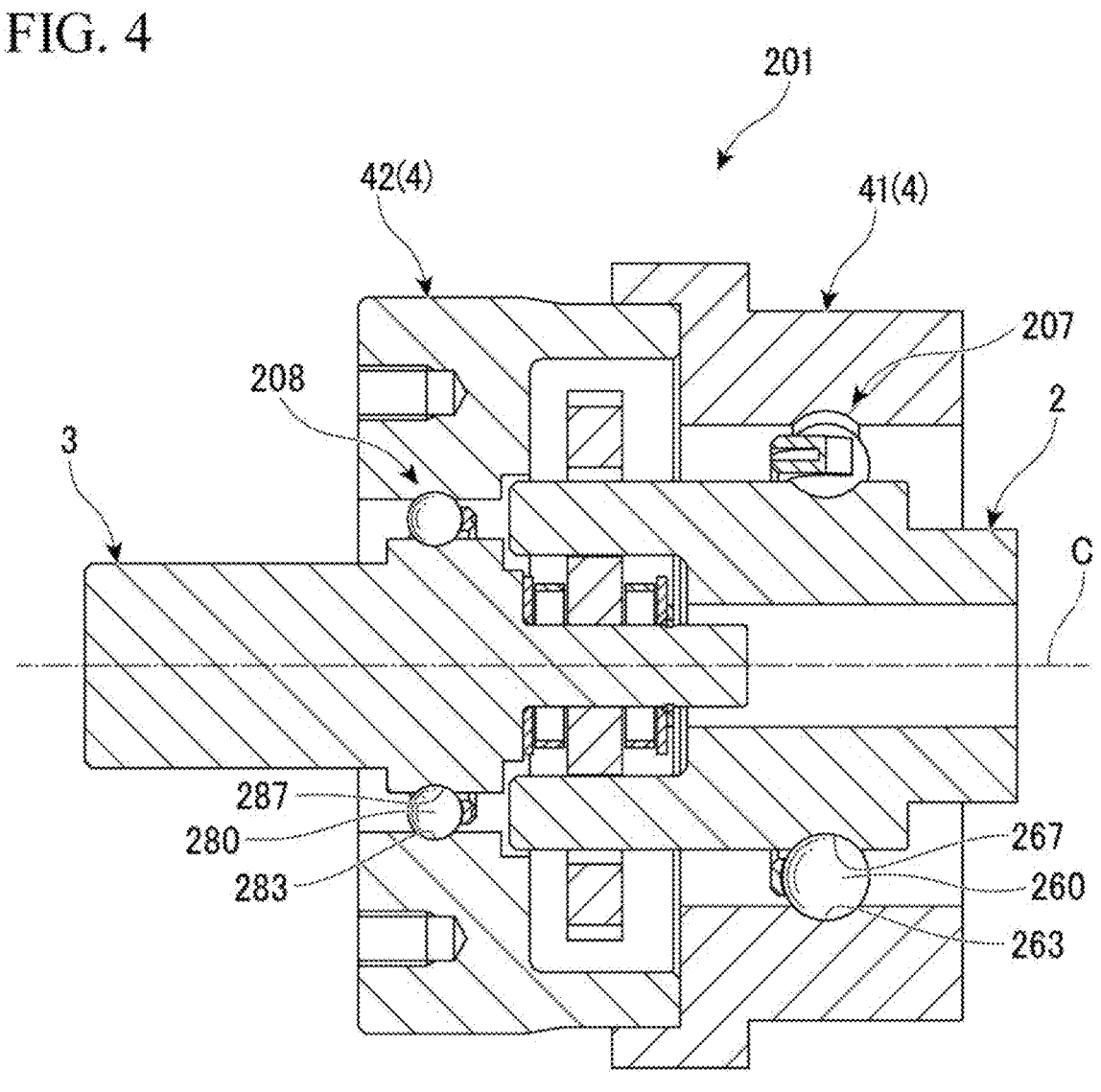
FIG. 4 is a cross-sectional view of a reverse-input blocking clutch according to a second embodiment.

A second embodiment of the present invention will be described. FIG. 4 is a cross-sectional view of a reverse-input blocking clutch 201 according to the second embodiment. This embodiment is different from the above-described first embodiment in that outer ring raceway grooves 263 and 283 in a first bearing mechanism 207 and a second bearing mechanism 208 are further integrated with the housing 4.

In the second embodiment, the first bearing mechanism 207 includes a ball (a rolling element in the claims) 260 which rolls about an axis, an outer ring raceway groove 263 which is integrally formed with the first housing 41, and an inner ring raceway groove 267 which is integrally formed with the input shaft 2. The outer ring raceway groove 263 and the inner ring raceway groove 267 are examples of raceway surfaces in the claims. The inner peripheral surface of the first housing 41 is provided with the outer ring raceway groove 263 for rolling the ball 260. The outer peripheral surface of the input shaft 2 is provided with the inner ring raceway groove 267 for rolling the ball 260. In other words, the first bearing mechanism 207 of this embodiment is formed without separate members constituting the inner ring and the outer ring.

The first bearing mechanism 207 of this embodiment has a ball bearing design in which the balls 260 are assembled without deforming the outer ring 61. In normal ball bearings, an external force is applied to the outer ring to elastically deform the outer ring into an elliptical shape, so that more balls can be packed into the outer ring. On the other hand, in the ball bearing design, balls are packed without deforming the outer ring. Accordingly, in the ball bearing design, the number of balls to be packed is reduced compared to the normal ball bearing that deforms the outer ring, but balls can be packed without deforming the outer ring. In this embodiment, the outer ring of the ball bearing is shared with the first housing 41 and the first housing 41 cannot be deformed. Therefore, since the ball bearing design is adopted, it is possible to form a ball bearing even when the first housing 41 is used as the outer ring of the ball bearing.

The second bearing mechanism 208 includes a ball (a rolling element in the claims) 280 which rolls about an axis, an outer ring raceway groove 283 which is integrally formed with the second housing 42, and an inner ring raceway groove 287 which is integrally formed with the output shaft 3. The outer ring raceway groove 283 and the inner ring raceway groove 287 are examples of raceway surfaces in the claims. The inner peripheral surface of the second housing 42 is provided with the outer ring raceway groove 283 for rolling the ball 280. The outer peripheral surface of the output shaft 3 is provided with the inner ring raceway groove 287 for rolling the ball 280. In other words, the second bearing mechanism 208 of this embodiment is formed without separate members constituting the inner ring and the outer ring.

The second housing 42 of this embodiment is formed, for example, by machining the second spigot fitting surface 78, the pressed surface 77, and the outer ring raceway groove 283 in the same process. Similarly, the first housing 41 is formed, for example, by machining the first spigot fitting surface 48 and the outer ring raceway groove 263 in the same process. Accordingly, it is possible to further improve the coaxiality of the second housing 42, the output shaft 3, the first housing 41, and the input shaft 2.

The first bearing mechanism 207 and the second bearing mechanism 208 are ball bearings and have the ball bearing design. Accordingly, the above-described bearing mechanism can be realized without deforming the housing 4 corresponding to the outer ring.

Third Embodiment

Figure 5:
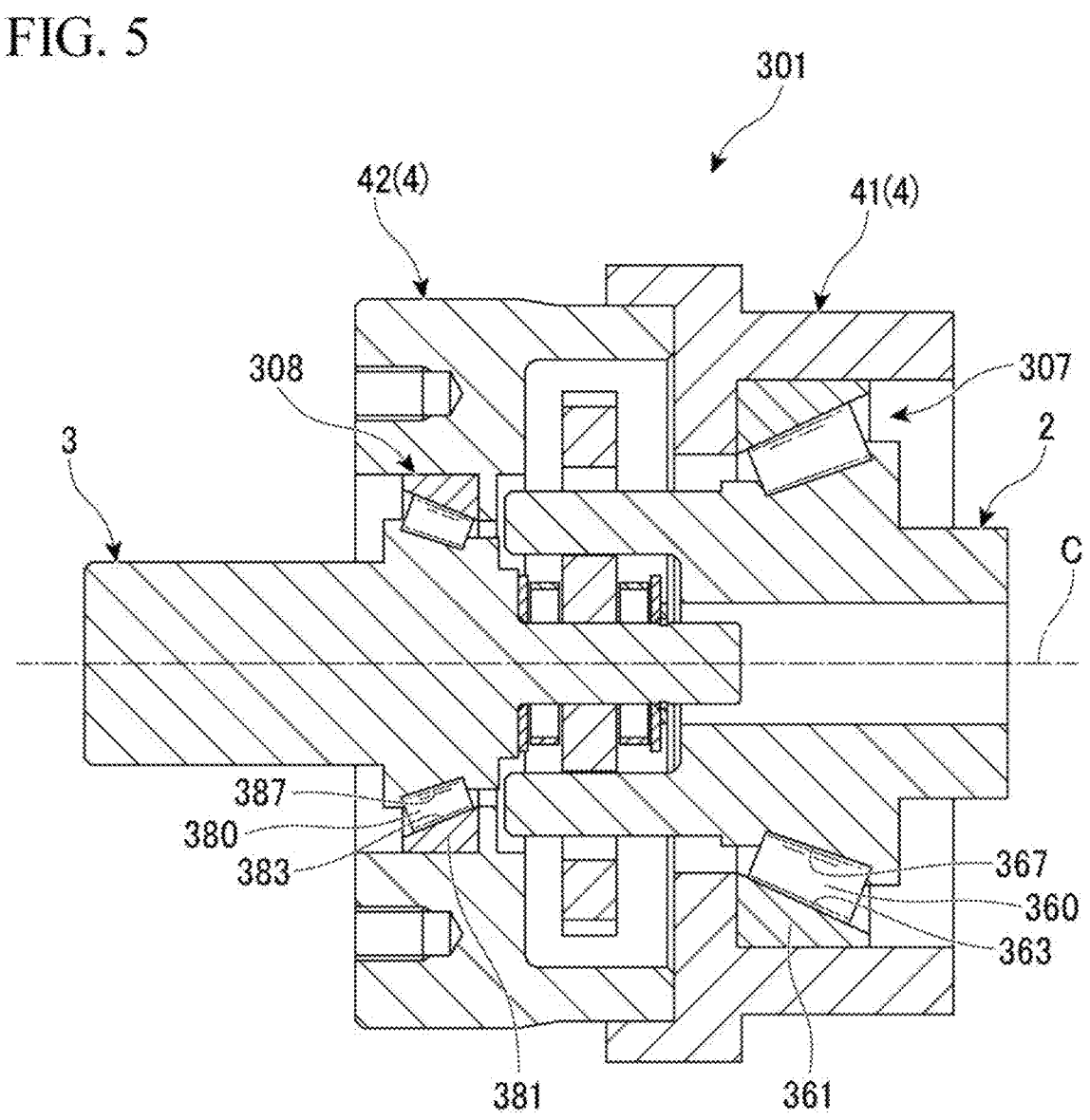
FIG. 5 is a cross-sectional view of a reverse-input blocking clutch according to a third embodiment.

A third embodiment of the present invention will be described. FIG. 5 is a cross-sectional view of a reverse-input blocking clutch 301 according to the third embodiment. This embodiment is different from the above-described first embodiment in that bearing mechanisms 307 and 308 are tapered roller bearings. Furthermore, the illustration of the retainer between the rolling elements is omitted from the third embodiment and later.

In the third embodiment, the first bearing mechanism 307 is a tapered roller bearing. The first bearing mechanism 307 includes a truncated conical roller (a rolling element in the claims) 360 which rolls about an axis, an outer ring 361, an outer ring raceway groove 363 which is formed in the outer ring 361, and an inner ring raceway groove 367 which is integrally formed with the input shaft 2. The inner ring raceway groove 367 is an example of a raceway surface in the claims. The outer peripheral surface of the outer ring 361 is attached to the bearing receiving portion 47 of the cylindrical portion 43 in the first housing 41 by press-fitting or the like. The inner peripheral surface of the outer ring 361 is provided with the outer ring raceway groove 363 for rolling the roller 360. The outer peripheral surface of the input shaft 2 is provided with the inner ring raceway groove 367 for rolling the roller 360. In other words, the first bearing mechanism 307 of this embodiment is formed without separate members constituting the inner ring.

The second bearing mechanism 308 is a tapered roller bearing. The second bearing mechanism 308 includes a truncated conical roller (a rolling element in the claims) 380 which rolls about an axis, an outer ring 381, an outer ring raceway groove 383 which is formed in the outer ring 381, and an inner ring raceway groove 387 which is integrally formed with the output shaft 3. The inner ring raceway groove 387 is an example of a raceway surface in the claims. The outer peripheral surface of the outer ring 381 is attached to the bearing receiving portion 74 of the small diameter cylindrical portion 71 in the second housing 42 by press-fitting or the like. The inner peripheral surface of the outer ring 381 is provided with the outer ring raceway groove 383 for rolling the roller 380. The outer peripheral surface of the output shaft 3 is provided with the inner ring raceway groove 387 for rolling the roller 380. In other words, the second bearing mechanism 308 of this embodiment is formed without separate members constituting the inner ring.

Fourth Embodiment

Figure 6:
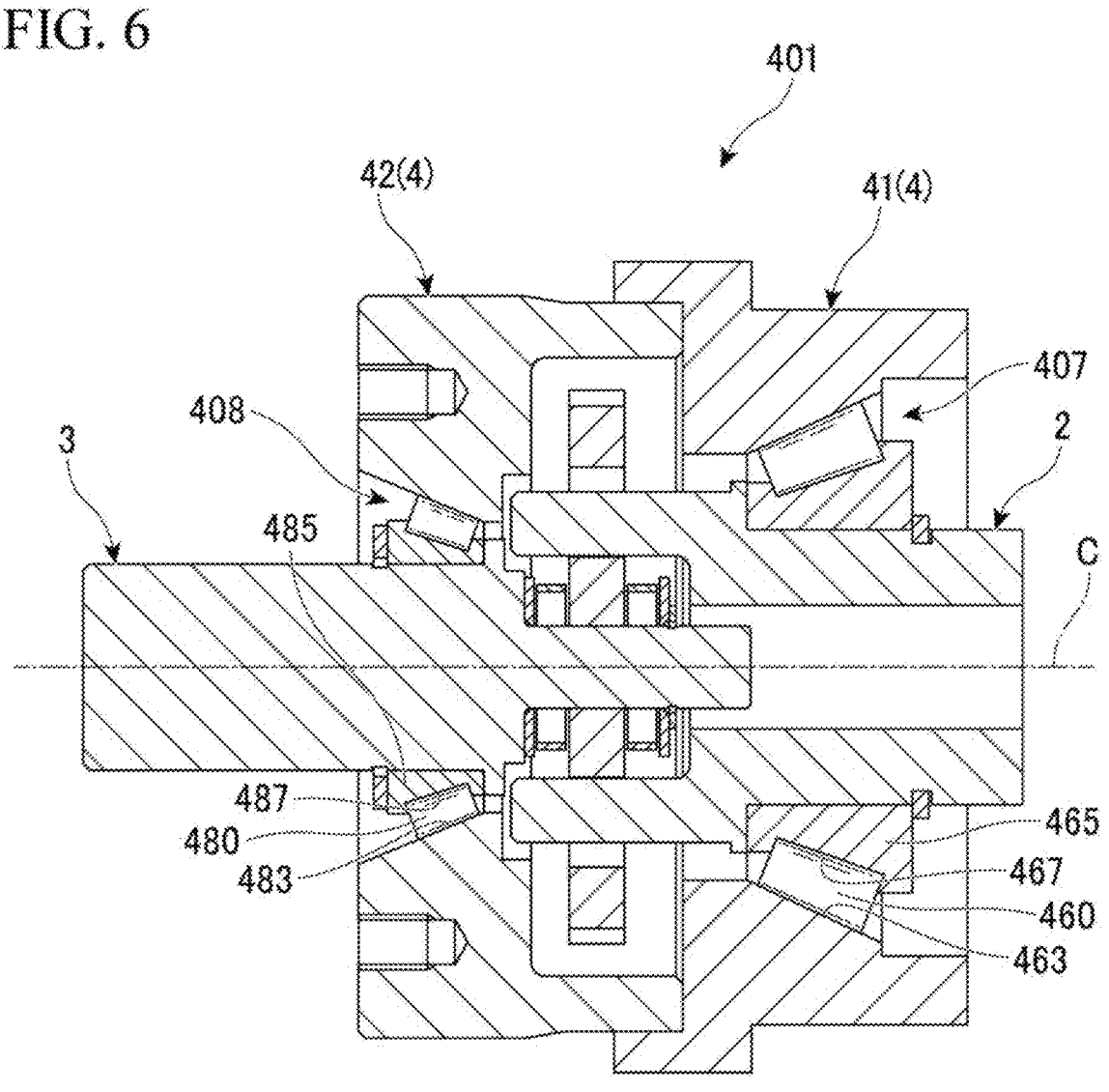
FIG. 6 is a cross-sectional view of a reverse-input blocking clutch according to a fourth embodiment.

A fourth embodiment of the present invention will be described. FIG. 6 is a cross-sectional view of a reverse-input blocking clutch 401 according to the fourth embodiment. This embodiment is different from the above-described third embodiment in that outer ring raceway grooves 463 and 483 are integrated with the input shaft 2 or the output shaft 3.

In the fourth embodiment, the first bearing mechanism 407 is a tapered roller bearing. The first bearing mechanism 407 includes a truncated conical roller (a rolling element in the claims) 460 which rolls about an axis, an outer ring raceway groove 463 which is integrally formed with the first housing 41, an inner ring 465, and an inner ring raceway groove 467 which is formed in the inner ring 465. The outer ring raceway groove 463 is an example of a raceway surface in the claims. The inner peripheral surface of the first housing 41 is provided with the outer ring raceway groove 463 for rolling the roller 460. The inner peripheral surface of the inner ring 465 is attached to the outer peripheral surface of the input shaft 2 by press-fitting or the like. The outer peripheral surface of the inner ring 465 is provided with the inner ring raceway groove 467 for rolling the roller 460. In other words, the first bearing mechanism 407 of this embodiment is formed without separately having a member constituting the outer ring.

The second bearing mechanism 408 is a tapered roller bearing. The second bearing mechanism 408 includes a truncated conical roller (a rolling element in the claims) 480 which rolls about an axis, an outer ring raceway groove 483 which is integrally formed with the second housing 42, an inner ring 485, and an inner ring raceway groove 487 which is formed in the inner ring 485. The outer ring raceway groove 483 is an example of a raceway surface in the claims. The inner peripheral surface of the second housing 42 is provided with the outer ring raceway groove 483 for rolling the roller 480. The inner peripheral surface of the inner ring 485 is attached to the outer peripheral surface of the output shaft 3 by press-fitting or the like. The outer peripheral surface of the inner ring 485 is provided with the inner ring raceway groove 487 for rolling the roller 480. In other words, the second bearing mechanism 408 of this embodiment is formed without separately having a member constituting the outer ring.

Fifth Embodiment

Figure 7:
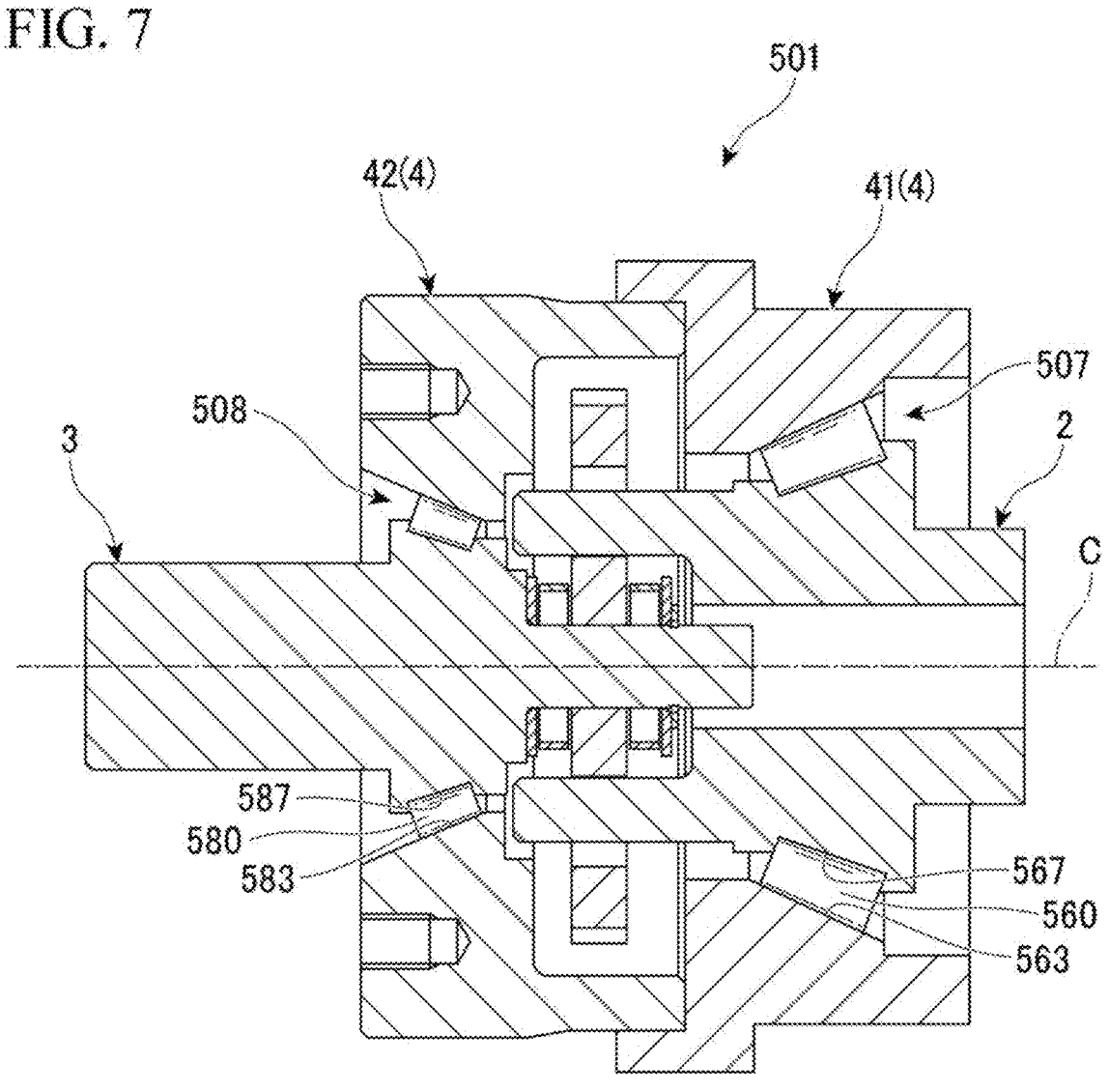
FIG. 7 is a cross-sectional view of a reverse-input blocking clutch according to a fifth embodiment.

A fifth embodiment of the present invention will be described. FIG. 7 is a cross-sectional view of a reverse-input blocking clutch 501 according to the fifth embodiment. This embodiment is different from the above-described fourth embodiment in that inner ring raceway grooves 563 and 583 in a first bearing mechanism 507 and a second bearing mechanism 508 are integrated with the housing 4.

In the fifth embodiment, the first bearing mechanism 507 is a tapered roller bearing. The first bearing mechanism 507 includes a truncated conical roller (a rolling element in the claims) 560 which rolls about an axis, an outer ring raceway groove 563 which is integrally formed with the first housing 41, and an inner ring raceway groove 567 which is integrally formed with the input shaft 2. The outer ring raceway groove 563 and the inner ring raceway groove 567 are examples of raceway surfaces in the claims. The inner peripheral surface of the first housing 41 is provided with the outer ring raceway groove 563 for rolling the roller 560. The outer peripheral surface of the input shaft 2 is provided with the inner ring raceway groove 567 for rolling the roller 560. In other words, the first bearing mechanism 507 of this embodiment is formed without separately having a member constituting the inner ring and the outer ring.

The second bearing mechanism 508 is a tapered roller bearing. The second bearing mechanism 508 includes a truncated conical roller (a rolling element in the claims) 580 which rolls about an axis, an outer ring raceway groove 583 which is integrally formed with the second housing 42, and an inner ring raceway groove 587 which is integrally formed with the output shaft 3. The outer ring raceway groove 583 and the inner ring raceway groove 587 are examples of raceway surfaces in the claims. The inner peripheral surface of the second housing 42 is provided with the outer ring raceway groove 583 for rolling the roller 580. The outer peripheral surface of the output shaft 3 is provided with the inner ring raceway groove 587 for rolling the roller 580. In other words, the second bearing mechanism 508 of this embodiment is formed without separately having a member constituting the inner ring and the outer ring.

Sixth Embodiment

Figure 8:
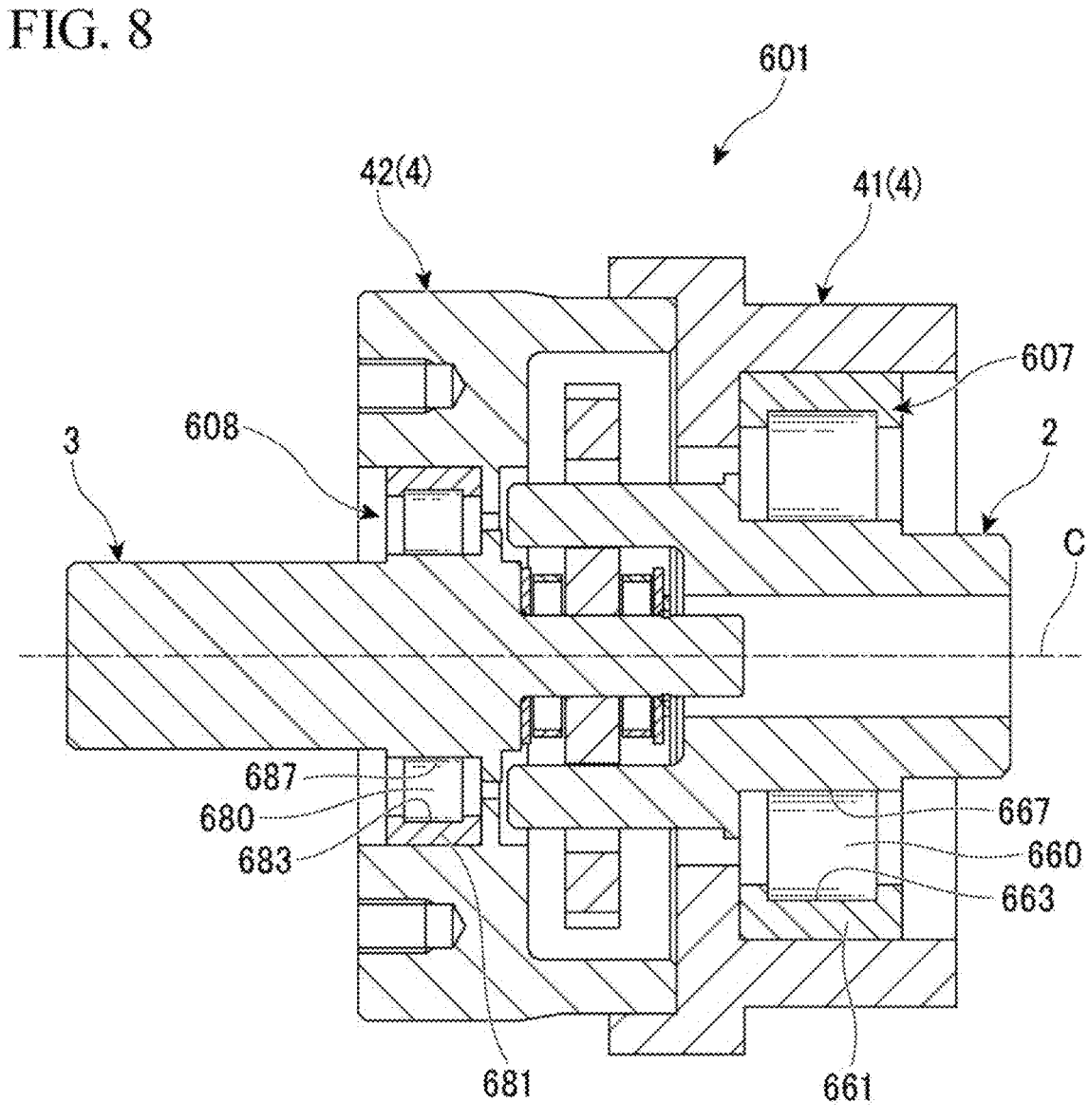
FIG. 8 is a cross-sectional view of a reverse-input blocking clutch according to a sixth embodiment.

A sixth embodiment of the present invention will be described. FIG. 8 is a cross-sectional view of a reverse-input blocking clutch 601 according to the sixth embodiment. This embodiment is different from the above-described first embodiment in that each of bearing mechanisms 607 and 608 is a cylindrical roller bearing.

In the sixth embodiment, the first bearing mechanism 607 is a cylindrical roller bearing. The first bearing mechanism 607 includes a cylindrical roller (a rolling element in the claims) 660 which rolls about an axis, an outer ring 661, an outer ring raceway groove 663 which is formed in the outer ring 661, and an inner ring raceway groove 667 which is integrally formed with the input shaft 2. The inner ring raceway groove 667 is an example of a raceway surface in the claims. The outer peripheral surface of the outer ring 661 is attached to the bearing receiving portion 47 of the cylindrical portion 43 in the first housing 41 by press-fitting or the like. The inner peripheral surface of the outer ring 661 is provided with the outer ring raceway groove 663 for rolling the roller 660. The outer peripheral surface of the input shaft 2 is provided with the inner ring raceway groove 667 for rolling the roller 660. In other words, the first bearing mechanism 607 of this embodiment is formed without separate members constituting the inner ring.

The second bearing mechanism 608 is a cylindrical roller bearing. The second bearing mechanism 608 includes a cylindrical roller (a rolling element in the claims) 680 which rolls about an axis, an outer ring 681, an outer ring raceway groove 683 which is formed in the outer ring 681, and an inner ring raceway groove 687 which is integrally formed with the output shaft 3. The inner ring raceway groove 687 is an example of a raceway surface in the claims. The outer peripheral surface of the outer ring 681 is attached to the bearing receiving portion 74 of the small diameter cylindrical portion 71 in the second housing 42 by press-fitting or the like. The inner peripheral surface of the outer ring 681 is provided with the outer ring raceway groove 683 for rolling the roller 680. The outer peripheral surface of the output shaft 3 is provided with the inner ring raceway groove 687 for rolling the roller 680. In other words, the second bearing mechanism 608 of this embodiment is formed without separate members constituting the inner ring.

Seventh Embodiment

Figure 9:
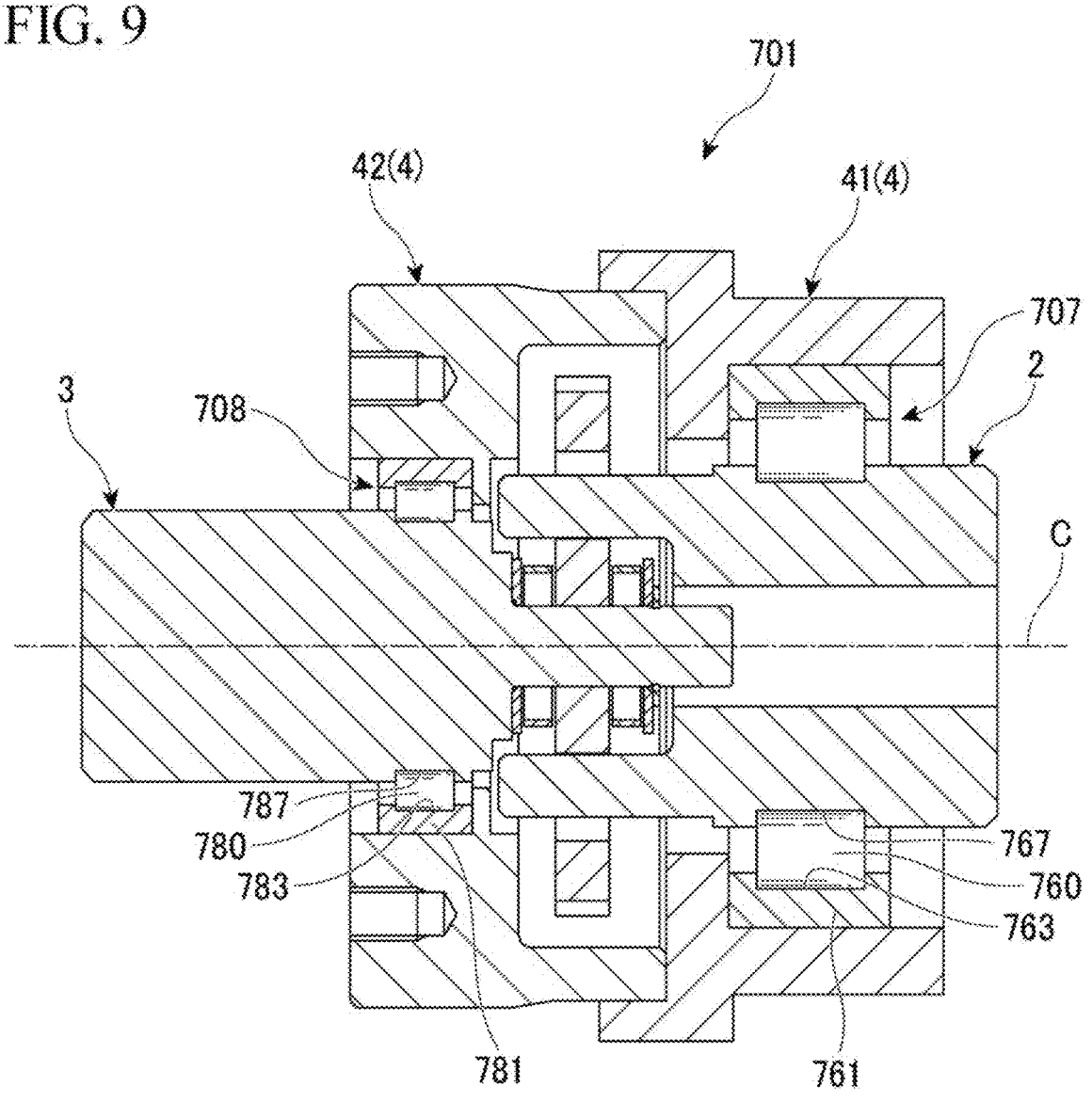
FIG. 9 is a cross-sectional view of a reverse-input blocking clutch according to a seventh embodiment.

A seventh embodiment of the present invention will be described. FIG. 9 is a cross-sectional view of a reverse-input blocking clutch 701 according to the seventh embodiment. This embodiment is different from the above-described first embodiment in that each of bearing mechanisms 707 and 708 is a needle roller bearing.

In the seventh embodiment, the first bearing mechanism 707 is a needle roller bearing. The first bearing mechanism 707 includes a needle roller (a rolling element in the claims) 760 which rolls about an axis, an outer ring 761, an outer ring raceway groove 763 which is formed in the outer ring 761, and an inner ring raceway surface 767 which is integrally formed with the input shaft 2. The inner ring raceway surface 767 is an example of a raceway surface in the claims. The outer peripheral surface of the outer ring 761 is attached to the bearing receiving portion 47 of the cylindrical portion 43 in the first housing 41 by press-fitting or the like. The inner peripheral surface of the outer ring 761 is provided with the outer ring raceway groove 763 for rolling the roller 760. The outer peripheral surface of the input shaft 2 is provided with the inner ring raceway surface 767 for rolling the roller 760. In other words, the first bearing mechanism 707 of this embodiment is formed without separate members constituting the inner ring. The inner ring raceway surface 767 is a surface on which the roller 760 rolls and may be flush with, for example, the other outer peripheral surface of the input shaft 2. Then, the surface properties of the portion where the roller 760 rolls may be changed by coating or machining.

The second bearing mechanism 708 is a needle roller bearing. The second bearing mechanism 708 includes a needle roller (a rolling element in the claims) 780 which rolls about an axis, an outer ring 781, an outer ring raceway groove 783 which is formed in the outer ring 781, and an inner ring raceway surface 787 which is integrally formed with the output shaft 3. The inner ring raceway surface 787 is an example of a raceway surface in the claims. The outer peripheral surface of the outer ring 781 is attached to the bearing receiving portion 74 of the small diameter cylindrical portion 71 in the second housing 42 by press-fitting or the like. The inner peripheral surface of the outer ring 781 is provided with the outer ring raceway groove 783 for rolling the roller 780. The outer peripheral surface of the output shaft 3 is provided with the inner ring raceway surface 787 for rolling the roller 780. In other words, the second bearing mechanism 708 of this embodiment is formed without separate members constituting the inner ring.

Eighth Embodiment

Figure 10:
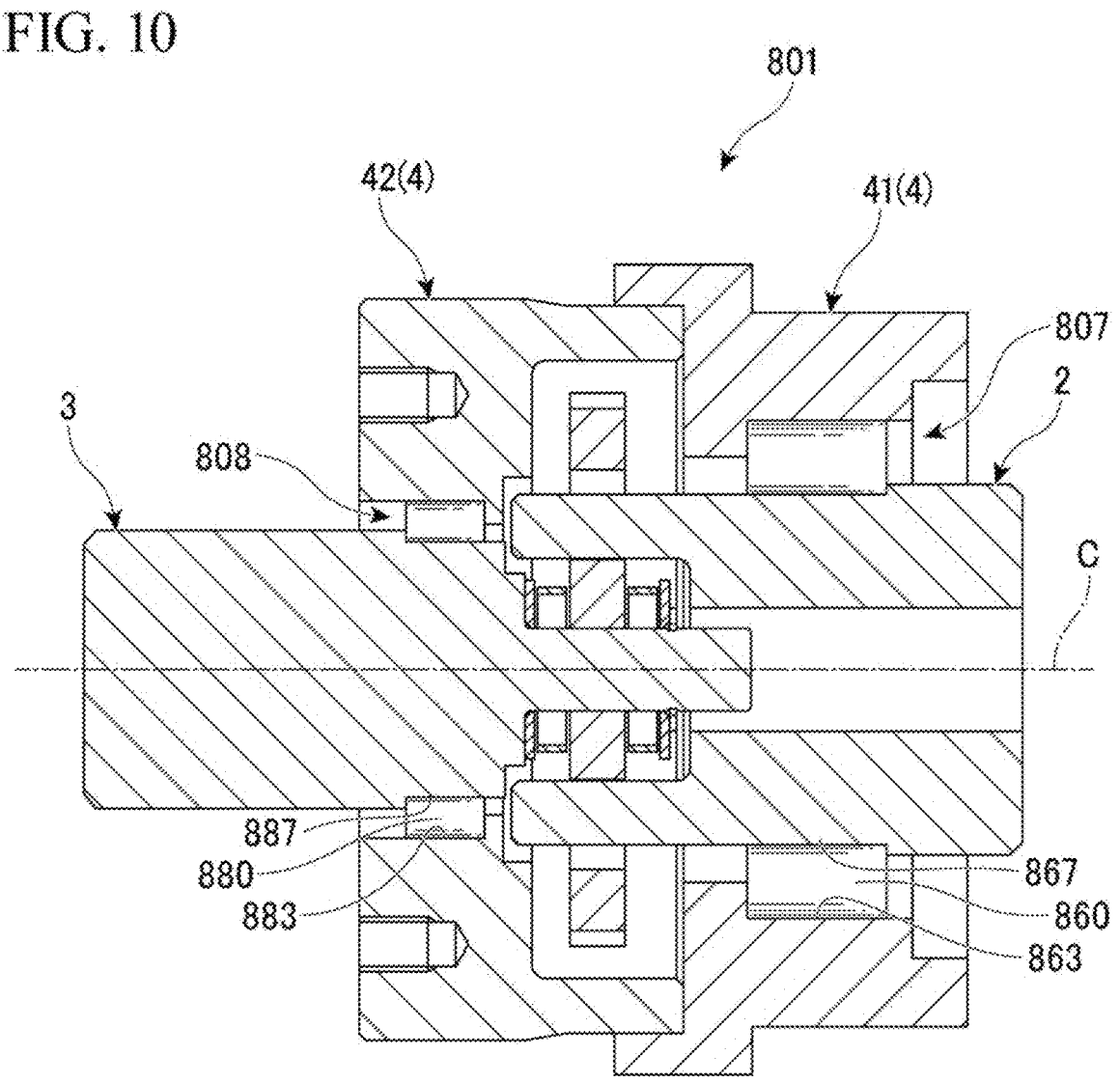
FIG. 10 is a cross-sectional view of a reverse-input blocking clutch according to an eighth embodiment.

An eighth embodiment of the present invention will be described. FIG. 10 is a cross-sectional view of a reverse-input blocking clutch 801 according to the eighth embodiment. This embodiment is different from the above-described seventh embodiment in that outer ring raceway grooves 863 and 883 in a first bearing mechanism 807 and a second bearing mechanism 808 are further integrated with the housing 4.

In the eighth embodiment, the first bearing mechanism 807 is a needle roller bearing. The first bearing mechanism 807 includes a needle roller (a rolling element in the claims) 860 which rolls about an axis, an outer ring raceway groove 863 which is integrally formed with the first housing 41, and an inner ring raceway surface 867 which is integrally formed with the input shaft 2. The outer ring raceway groove 863 and the inner ring raceway surface 867 are examples of raceway surfaces in the claims. The inner peripheral surface of the first housing 41 is provided with the outer ring raceway groove 863 for rolling the roller 860. The outer peripheral surface of the input shaft 2 is provided with the inner ring raceway surface 867 for rolling the roller 860. In other words, the first bearing mechanism 807 of this embodiment is formed without separately having a member constituting the inner ring and the outer ring.

The second bearing mechanism 808 is a needle roller bearing. The second bearing mechanism 808 includes a needle roller (a rolling element in the claims) 880 which rolls about an axis, an outer ring raceway groove 883 which is integrally formed with the second housing 42, and an inner ring raceway surface 887 which is integrally formed with the output shaft 3. The outer ring raceway groove 883 and the inner ring raceway surface 887 are examples of raceway surfaces in the claims. The inner peripheral surface of the second housing 42 is provided with the outer ring raceway groove 883 for rolling the roller 880. The outer peripheral surface of the output shaft 3 is provided with the inner ring raceway surface 887 for rolling the roller 880. In other words, the second bearing mechanism 808 of this embodiment is formed without separately having a member constituting the inner ring and the outer ring.

According to the second to eighth embodiments, various kinds of bearings can be applied to the present invention.

Thus, the versatility of the reverse-input blocking clutch 1, 201, 301, 401, 501, 601, 701, and 801 can be improved.

Furthermore, the technical scope of the present invention is not limited to the above-described embodiments, and various changes can be made without departing from the spirit of the present invention.

For example, in the above-described first embodiment, a configuration has been described in which the input shaft body 21, the pedestal portion 22, and the arm portion 23 of the input shaft 2 are integrally formed, but the present invention is not limited thereto. The input shaft 2 may be configured by combining a plurality of components. Similarly, the output shaft body 31 and the insertion portion 32 of the output shaft 3 may be formed by combining other members.

In the above-described embodiments, the linkless type reverse-input blocking clutch 1 without using a link mechanism has been described as an example of the reverse-input blocking mechanism, but the present invention is not limited thereto. The above-described bearing mechanism may be adopted in a link type reverse-input blocking clutch using a link mechanism, which is a known technique, as the reverse-input blocking mechanism.

The input shaft body 21 and the arm portion 23 may be formed as separate members.

As the bearing mechanisms 7, 8, 207, 208, 307, 308, 407, 408, 507, 508, 607, 608, 707, 708, 807, and 808, for example, deep groove ball bearings, angular contact ball bearings, four-point ball bearings, double row ball bearings, and the like may be applied in addition to the above-described bearings.

REFERENCE SIGNS LIST

1, 201, 301, 401, 501, 601, 701, 801 Reverse-input blocking clutch
2 Input shaft
3 Output shaft
4 Housing
5 Engaging element
7, 207, 307, 407, 507, 607, 707, 807 First bearing mechanism
8, 208, 308, 408, 508, 608, 708, 808 Second bearing mechanism
41 First housing
42 Second housing
48 First spigot fitting surface (spigot fitting surface)
51 Sliding surface (sliding contact portion)
53 Input side engaging portion (first engaging portion)
54 Output side engaging portion (second engaging portion)
78 Second spigot fitting surface (spigot fitting surface)
60, 80, 260, 280 Ball (rolling element)
360, 380, 460, 480, 560, 580, 660, 680, 760, 780, 860, 880 Roller (rolling element)
63, 263, 363, 463, 563, 663, 763, 863 Outer ring raceway groove (of first bearing mechanism)
67, 267, 367, 467, 567, 667 Inner ring raceway groove (of first bearing mechanism)
767, 867 Inner ring raceway surface (of first bearing mechanism)
83, 283, 383, 483, 583, 683, 783, 883 Outer ring raceway groove (of second bearing mechanism)
87, 287, 387, 487, 587, 687 Inner ring raceway groove (of second bearing mechanism)
787, 887 Inner ring raceway surface (of second bearing mechanism)
77 Pressed surface
C Central axis

The invention claimed is:

1. A reverse-input blocking clutch comprising:
a housing which has a pressed surface;
an input shaft which is provided inside the pressed surface in a radial direction;
an output shaft which is provided inside the pressed surface in the radial direction; and
a pair of engaging elements which are movable relative to each other in the radial direction and each of which has a first engaging portion facing the input shaft, a second engaging portion facing the output shaft, and a sliding contact portion facing the pressed surface,
wherein when rotational force is input to the input shaft, the pair of engaging elements move toward each other radially inward based on the engagement between the input shaft and the first engaging portion and transmit the rotational force to the output shaft based on the engagement between the second engaging portion and the output shaft,
wherein when rotational force is reversely input to the output shaft, the pair of engaging elements move away from each other radially outward based on the engagement between the output shaft and the second engaging portion and the pressed surface and the sliding contact portion are frictionally engaged,
wherein at least one of the input shaft, the output shaft, and the housing has a raceway surface which contacts at least one rolling element of a first bearing mechanism between the input shaft and the housing and a second bearing mechanism between the output shaft and the housing,
wherein the housing includes a first housing which rotatably holds the input shaft and a second housing which rotatably holds the output shaft,
wherein the first housing and the second housing are spigot-joined to each other,
wherein an inner peripheral surface of the first housing is a spigot fitting surface,
wherein an outer peripheral surface of the second housing is a spigot fitting surface spigot-joined to the inner peripheral surface of the first housing,
wherein an inner peripheral surface of the second housing is provided with the pressed surface, and
wherein the spigot fitting surface of the first housing overlaps at least part of the engaging element in an axial direction.

2. The reverse-input blocking clutch according to claim 1, wherein the first bearing mechanism and the second bearing mechanism are ball bearings, and
wherein a bearing mechanism in which a raceway groove is integrally formed among the first bearing mechanism and the second bearing mechanism has a ball bearing design in which balls are assembled without deforming an outer ring.

3. The reverse-input blocking clutch according to claim 1, wherein the first bearing mechanism and the second bearing mechanism are ball bearings, and
wherein a bearing mechanism in which a raceway groove is integrally formed among the first bearing mechanism and the second bearing mechanism has a ball bearing design in which balls are assembled without deforming an outer ring.

4. The reverse-input blocking clutch according to claim 1, wherein the first bearing mechanism and the second bearing mechanism are ball bearings, and wherein a bearing mechanism in which a raceway groove is integrally formed among the first bearing mechanism and the second bearing mechanism has a ball bearing design in which balls are assembled without deforming an outer ring.

5. The reverse-input blocking clutch according to claim 4,
wherein the first bearing mechanism and the second bearing mechanism are ball bearings, and
wherein a bearing mechanism in which a raceway groove is integrally formed among the first bearing mechanism and the second bearing mechanism has a ball bearing design in which balls are assembled without deforming an outer ring.

6. A reverse-input blocking clutch comprising:
a housing which has a pressed surface;
an input shaft which is provided inside the pressed surface in a radial direction;
an output shaft which is provided inside the pressed surface in the radial direction; and
a pair of engaging elements which are movable relative to each other in the radial direction and each of which has a first engaging portion facing the input shaft, a second engaging portion facing the output shaft, and a sliding contact portion facing the pressed surface,
wherein when rotational force is input to the input shaft, the pair of engaging elements move toward each other radially inward based on the engagement between the input shaft and the first engaging portion and transmit the rotational force to the output shaft based on the engagement between the second engaging portion and the output shaft,
wherein when rotational force is reversely input to the output shaft, the pair of engaging elements move away from each other radially outward based on the engagement between the output shaft and the second engaging portion and the pressed surface and the sliding contact portion are frictionally engaged,
wherein at least one of the input shaft, the output shaft, and the housing has a raceway surface which contacts at least one rolling element of a first bearing mechanism between the input shaft and the housing and a second bearing mechanism between the output shaft and the housing, and
wherein the housing has an outer raceway surface which contacts at least one rolling element of the first bearing mechanism and the second bearing mechanism.

7. The reverse-input blocking clutch according to claim 6,
wherein an inner peripheral surface of the housing is provided with:
the outer raceway surface which contacts a rolling element provided of the second bearing mechanism between the output shaft and the housing; and
the pressed surface.

8. The reverse-input blocking clutch according to claim 7,
wherein the housing includes a first housing which rotatably holds the input shaft and a second housing which rotatably holds the output shaft,
wherein the second housing has the outer raceway surface and the pressed surface, and
wherein an inner peripheral surface of the first housing and an outer peripheral surface of the second housing are spigot-joined to each other.

9. The reverse-input blocking clutch according to claim 6,
wherein an inner peripheral surface of the housing is provided with:
the outer raceway surface which contacts a rolling element of the first bearing mechanism provided between the input shaft and the housing; and
the pressed surface.

10. The reverse-input blocking clutch according to claim 9,
wherein the housing includes a first housing which rotatably holds the input shaft and a second housing which rotatably holds the output shaft,
wherein the first housing has the outer raceway surface and the pressed surface, and
wherein an outer peripheral surface of the first housing and an inner peripheral surface of the second housing are spigot-joined to each other.

11. The reverse-input blocking clutch according to claim 6,
wherein at least one of the input shaft and the output shaft is integrally formed with an inner raceway surface in contact with the at least one rolling element.

12. The reverse-input blocking clutch according to claim 6,
wherein at least one of the input shaft and the output shaft, and the inner raceway surface in contact with the at least one rolling element corresponding to at least one of the input shaft and the output shaft in the first bearing mechanism and the second bearing mechanism are provided separately.

13. The reverse-input blocking clutch according to claim 6,
wherein at least one of the first bearing mechanism and the second bearing mechanism are ball bearings.

14. The reverse-input blocking clutch according to claim 6,
wherein at least one of the first bearing mechanism and the second bearing mechanism are tapered roller bearings.

15. The reverse-input blocking clutch according to claim 6,
wherein the first bearing mechanism and the second bearing mechanism differ from each other in at least one of the bearing size and type.

* * * * *